(No Model.)
G. W. RICHARDSON.
DEVICE FOR CONVERTING MOTION.
No. 311,610. Patented Feb. 3, 1885.
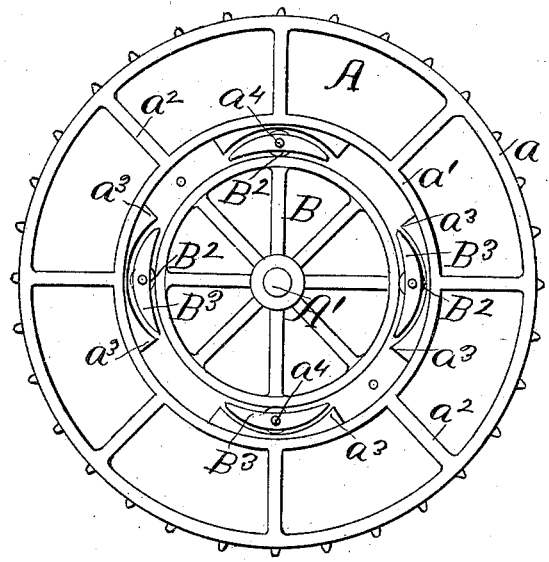
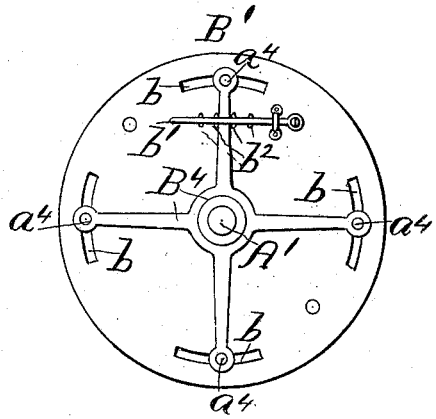
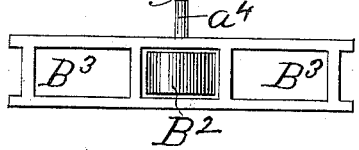
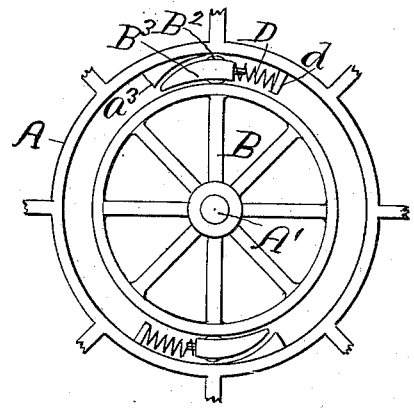
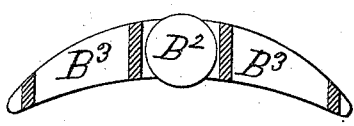
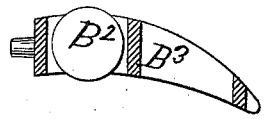
Witnesses:
Frank J Blanchard
L. M. Freeman.
Inventor:
Geo. W. Richardson.
By L. B. Coupland & Co.
Attorneys.

UNITED STATES PATENT OFFICE.

GEORGE WASHINGTON RICHARDSON, OF PLANO, ILLINOIS.

DEVICE FOR CONVERTING MOTION.

SPECIFICATION forming part of Letters Patent No. 311,610, dated February 3, 1885.

Application filed November 21, 1884. (No model.)

*To all whom it may concern:*

Be it known that I, GEORGE W. RICHARDSON, of Plano, county of Kendall, and State of Illinois, have invented certain new and useful Improvements in Devices for Converting Motion, of which the following is a full, clear, and exact description, that will enable others to make and use the same, reference being had to the accompanying drawings, forming a part of this specification.

This invention relates to improvements in means for converting and transmitting motion; and it consists of certain novel features in the construction, combination, and operation of the several parts, as will be hereinafter set forth and claimed.

Figure 1 represents a traction drive-wheel embodying my improved features; Fig. 2, a view of the face-cap and adjusting-spider removed from the inner wheel shown in Fig. 1. Fig. 3 shows the manner of applying my improved features to the drive-wheel of a mowing-machine. Figs. 4, 5, and 6 are detached details of construction.

Referring to the drawings, A represents a traction-wheel, and B an inner wheel rigidly mounted on the driving-shaft $A'$. The traction-wheel consists of the rim $a$ and the inside ring, $a'$, connected by a number of arms, $a^2$. The back side of the wheel A is closed, so as to form an annular recess, in which the wheel B is adapted to revolve. The front side of the recess is closed by means of the removable face-cap $B'$, (shown in Fig. 2,) which may be secured in place by any suitable means. The inner circumferential surface of the traction-wheel, as shown, is provided at four different points with the inwardly-projecting surfaces $a^3$, which gradually widen to the ends, so as to contract or narrow the passage between said ends and the periphery of the wheel B, and forming a curved pathway contracted at both ends for the friction clamping-rollers $B^2$ and the segment-shaped carrier-frame $B^3$, in which said rollers are loosely inserted. The carrier-frame is narrowed at both ends and of the shape shown, so as to correspond to the curvature of the surfaces between which it is placed. When the clamping-rollers are in a central position, or in the widest part of the passage in which the same move, as shown in Fig. 1, the inner wheel, B, may be rotated, while the outer or traction wheel remains stationary; but if the carrier-frame and roller are moved the least trifle on either side of the middle position, in accordance with the direction in which the mechanism is to be rotated, the friction-roller will grip the surfaces and cause the wheels to revolve simultaneously.

The shifting of the carrier-frame and roller is accomplished by means of certain mechanism, which will now be described. The carrier frame or frames $B^3$ are provided on one side with the outwardly-projecting pins $a^4$, which are adapted to project through the elongated curved apertures $b$ in the face-cap $B'$, and to engage loosely with the outer ends of the arms forming the spider $B^4$, loosely mounted on the hub of the face-cap, as shown in Fig. 2. The adjusting-lever $b'$ is provided with a number of stops, $b^2$, and is attached at one end to the face-cap in such a manner as to allow the opposite end to be sprung away from said face-cap, so as to conveniently allow one of the arms of the spider $B^4$ to be adjusted between any of the stops on said lever. The arm of the spider between the two inside stops on the lever $b'$, as shown in Fig. 2, corresponds to the position of the carrier-frames and clamping-rollers shown in Fig. 1. Now, by shifting the spider-arm into engagement with the stops farthest from the loose end of the lever $b'$, the wheels A and B are adapted to turn to the right, and by shifting the spider-arm in the opposite direction, so as to bring it into position between the two stops nearest the end of the lever $b$, the wheels will turn to the left. This movement of course shifts all of the spider-arms and the series of carrier-frames and clamping-rollers, and in locking one arm all the others are locked in any position to which they are capable of being adjusted. The spider-arms are made elastic and yielding in order to be sprung into place readily.

Fig. 6 illustrates the manner of using my device in connection with the traction drive-wheel of a mowing-machine. The general construction and operation are precisely the same as that embodied in Figs. 1 and 2, with this difference: One-half of the inwardly-projecting surface $a^3$ and a portion of the carrier-frame $B^3$ are cut away, for the reason that it is only necessary for the drive-wheel of a mowing-machine to move in one direction, and when backing in turning around, the outer or traction-wheel proper rotates, while the inside wheel remains stationary. The spider and adjusting-lever are also omitted. One end of the coiled spring D is connected to the cut-away end of the carrier-frame, while the opposite end is secured to the lug $d$ on the inner surface of the traction-wheel, this spring serving the purpose of retracting the carrier-frame and clamping-roller when backing the machine.

Having thus described my invention, what I claim as new, and desire to secure by Letters Patent, is—

1. The combination, with the traction-wheel having the inner circumferential surface thereof provided with inward projections which gradually widen toward the ends, as described, of the inner wheel mounted rigidly upon the driving-shaft, the segment-shaped carrier-frame inserted between the inwardly-projecting surfaces on said traction-wheel and the periphery of said inner wheel, and the clamping-roller loosely inserted in said frame, substantially as and for the purpose set forth.

2. The combination, with a traction-wheel, of an inner wheel adapted to rotate with or independently of said traction-wheel, a number of spaces formed between the adjacent surfaces of said wheels, said spaces being wide at the middle and gradually contracted or narrowed at the ends, of a carrier-frame corresponding in shape to said spaces, and a loose friction clamping-roller adapted to grip and lock said wheels together, substantially as and for the purpose set forth.

3. The combination, with a carrier frame or frames provided with the outwardly-projecting pins, of a face-cap having elongated apertures, a spider mounted loosely on the hub of said face-cap and having arms which are adapted to engage with said pins, and adjusting-lever provided with a number of stops, whereby said carrier-frames may be moved in either direction from a central position, substantially as and for the purpose set forth.

4. The combination, with a traction-wheel, of an inner wheel mounted rigidly on a driving-shaft, of one or more contracted spaces between the adjacent surfaces of said wheels, a carrier-frame adapted to move in said contracted space, a friction clamping-roller loosely inserted in said carrier-frame, and means for retracting said carrier-frame, substantially as and for the purpose set forth.

GEORGE WASHINGTON RICHARDSON.

Witnesses:
L. M. FREEMAN,
L. B. COUPLAND.